Patented July 4, 1939

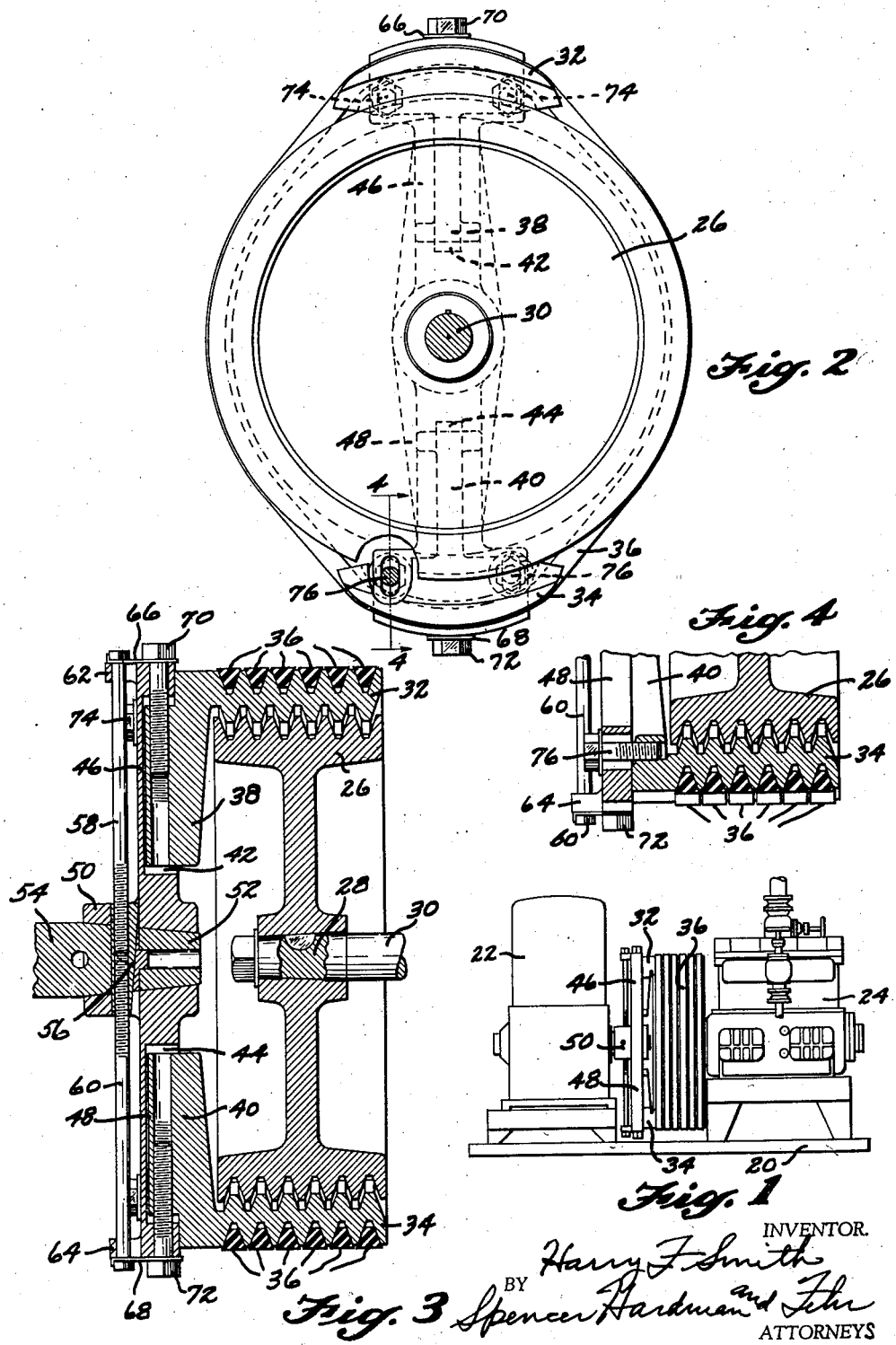

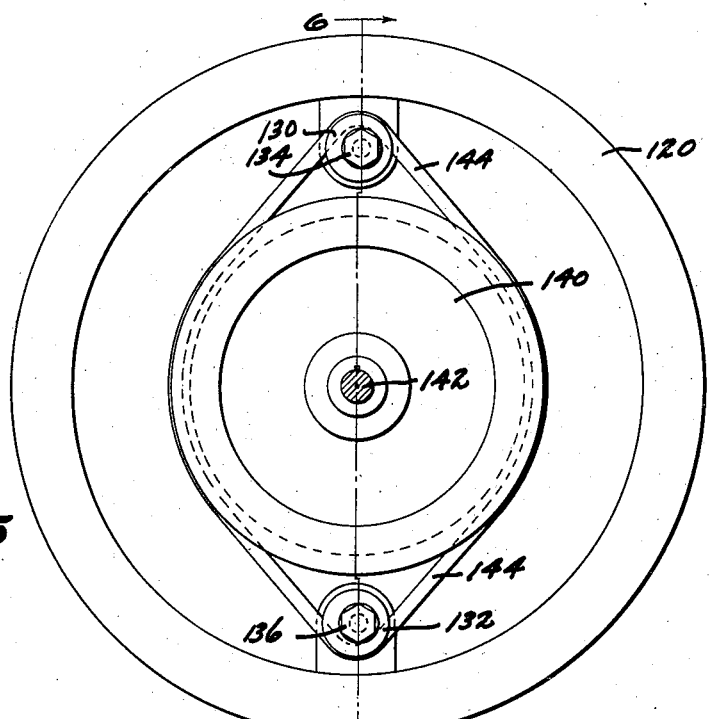
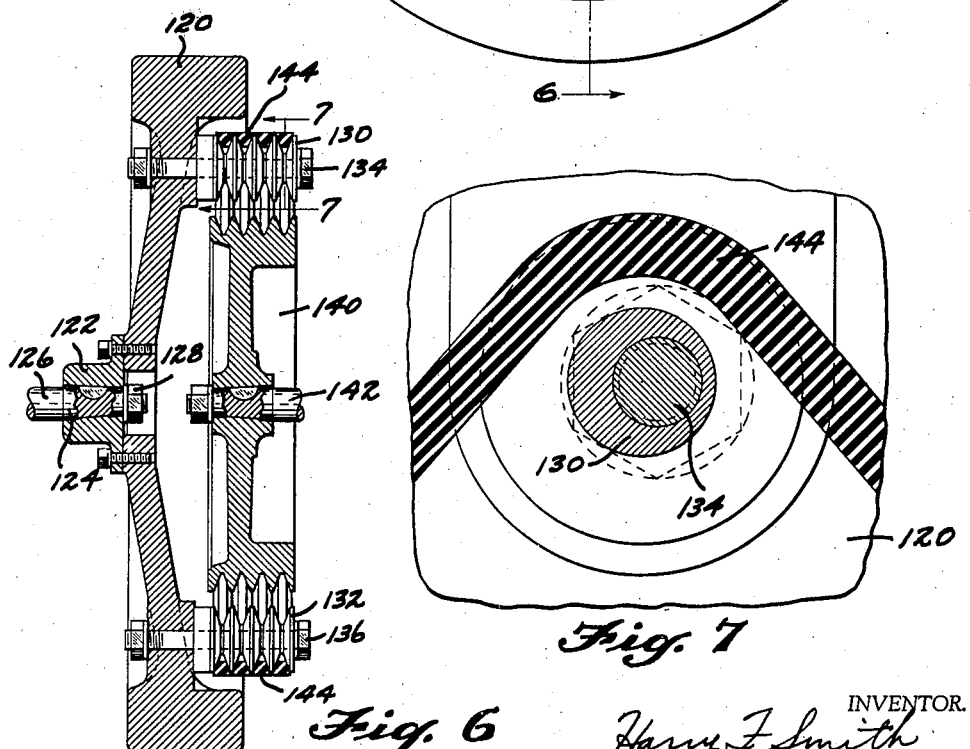

2,164,842

UNITED STATES PATENT OFFICE 2,164,842

REFRIGERATING APPARATUS

Harry F. Smith, Dayton, Ohio, assignor to General Motors Corporation, Dayton, Ohio, a corporation of Delaware Application November 19, 1937, Serial No. 175,493

7 Claims. (Cl. 64—11)

This invention relates to refrigerating apparatus and more particularly to flexible couplings for motor-compressor units and general applications.

In providing a coupling for direct connection of motor-compressor units, particularly those of large size, there has been considerable difficulty in obtaining a coupling which will prevent the whipping and torsional vibration, which will be compact, and which will accommodate considerable misalignment between the motor and compressor. This is particularly true when an internal combustion engine operating at variable speeds is employed to drive the compressor, since the power impulses of the internal combustion engine tend to set up torsional vibrations of considerable amplitudes whenever it operates at certain critical speeds and since the variable torsional resistance of the compressor sets up other torsional vibrations. In many cases, it is desirable to place the motor upon a vibration absorbing mounting which permits considerable movement of the motor.

It is an object of my invention to provide a flexible coupling for a substantially direct connection which will permit considerable misalignment between the driving and driven members and which will prevent the transmission of vibration and permit a close coupling.

It is a further object of my invention to provide a flexible coupling which has a considerable energy absorbing capacity for absorbing and damping the energy present in torsional vibrations.

It is a further object of my invention to provide a flexible coupling which will permit creeping or a slight amount of slippage to dampen and absorb torsional vibrations and in which the slippage may be controlled by a simple adjusting device.

It is a further object of my invention to provide a flexible coupling which will accommodate considerable misalignment in all directions, which will dampen torsional vibrations, which is elastic and yet will transmit relatively heavy loads.

Further objects and advantages of the present invention will be apparent from the following description, reference being had to the accompanying drawings, wherein a preferred form of the present invention is clearly shown.

In the drawings:

Fig. 1 is a side view of a motor-compressor unit coupled by one form of my improved coupling;

Fig. 2 is a view of the coupling looking toward the compressor;

Fig. 3 is a vertical sectional view taken through the coupling as shown in Fig. 2;

Fig. 4 is a sectional view taken along the line 4—4 of Fig. 2;

Fig. 5 is a view of a modified form of coupling locking in the direction of the shaft;

Fig. 6 is a sectional view taken along the line 6—6 of Fig. 5; and

Fig. 7 is a sectional view taken along the line 7—7 of Fig. 6.

Briefly, I have shown an internal combustion engine connected to a compressor by a coupling in the form of a pulley fastened to the crank shaft of the internal combustion engine in the place of the usual flywheel and a pair of adjustable belt supports overlying the pulley which are connected by a cross-arm to the drive shaft of the compressor. V-belts are lodged in the grooves in the pulley and the belt supports and serve as a flexible driving connection between the motor and the compressor.

Referring now to the drawings and more particularly to Fig. 1, there is shown a base 20 which supports an internal combustion motor 22 at one end and a compressor 24 at the opposite end. Either or both of these members may be supported by the base upon vibration absorbing or floating mountings. The rear end of the crankshaft of the compressor 24 is provided with a multi-grooved V-belt pulley 26 which is fastened in place of the flywheel by means of a standard keyed taper fitting 28 to the rear end of the crankshaft 30. The pulley is shown provided with six V-belt grooves.

Overlying the pulley upon opposite sides thereof are arc-shaped belt supports 32 and 34 each having six V-belt grooves in the shape of an elipse. These arc-shaped belt supports 32 and 34 each overlie slightly less than 30° of the circumference of the pulley. Six V-belts, all designated by the reference character 36, are passed over the belt supports 32 and 34 and are lodged within the eliptical grooves in the belt supports. These belts also contact and are lodged within the intermediate portions of the V-belt grooves in the face of the pulley. Two portions of the grooves of the pulley, each approximately 90° in length, receive the portions of the belts between the two belt supports 32 and 34.

The belt supports 32 and 34 have tongues 38 and 40 provided with guiding projections which are lodged within grooves 42 and 44 in the arms 46 and 48. These arms 46 and 48 are integral parts of a 180° two-arm member which has its hub 50 provided with a tapered bore which fits upon the tapered end 52 of the crankshaft 54 of the internal combustion engine 22. This hub 50 is held upon the tapered end 52 of the shaft 54 by a tapered key 56 which may be held in place or moved by the long screws 58 and 60 which have their inner ends threaded into a threaded bore extending entirely through a tapered key 56 and which are supported at their head ends by the bosses 62 and 64.

These long screws are normally kept from turning by locking washers 66 and 68 which extend underneath the head of the screws 70 and 72 which extend from the end of the arm into the threaded bore within the tongues 38 and 40 of the belt supports 32 and 34. The locking plates 66 and 68 have turned-up edges which engage one of the flats of the head of the long screws 58 and 60. By providing the long screws 58 and 60, the tapered key 56 may be easily removed without requiring direct access to the key itself which is considerably less accessible. The screws 70 and 72 are employed to adjust the location of the tongues 38 and 40 of the supports 32 and 34 in their slideways in order to adjust the tension upon the belts. After the adjustment is made, the supports may be securely fastened in place by the two bolts provided for each support. The bolts for firmly fastening the support 32 are designated by the reference character 74 and the bolts for fastening the support 34 are designated by the reference character 76.

It will be seen that the only connection between the pulley 26 which is fastened to the motor and the belt supports 32 and 34 which are connected to the compressor shaft is through the purely frictional engagement with the six belts which are lodged in the belt grooves of the supports and the pulley. These belts are, of course, very flexible and there is a considerable free length in the belts between the portions lodged in the supports and the portions lodged in the pulley. This permits a considerable variation in the alignment of the engine shaft and the compressor shaft and makes it possible to use a floating or vibration absorbing support for both the motor and compressor. It also takes care of considerable misalignment in lining up the motor and compressor shafts and a considerable force can be transmitted through the frictional groove contact area provided between the belt supports and the pulley.

The frictional engagement between the belts and sides of the grooves permits creeping of the belts to dampen and absorb torsional vibrations. The belts provide a flexible slightly elastic connection between the driving and driven member and prevent the transmission of the vibration from the motor to the compressor and vice versa. The drive is perfectly quiet and the tension of the belts may be adjusted so as to permit slippage should the load upon the belts become too great. The grip upon the belt is well distributed. The drive is rather compact, simple and inexpensive. It is well adapted to dampen the irregular torque of the internal combustion engine and helps to smooth the torque which is transmitted to the compressor.

In Figs. 5, 6 and 7, I have shown another modification in which a flywheel 120 is provided with a bolted hub 122 having a tapered bore fastened to the tapered end 124 of the crankshaft 126 by a nut 128. The shaft 126 may form a portion of the drive shaft of the motor-compressor unit shown in Fig. 1. At two points upon the flywheel 120 there are provided the pulleys 130 and 132. These pulleys are not intended to rotate, but are provided with an eccentrically located aperture through which the bolts 134 and 136 extend and by which the pulleys 130 and 132 are fastened to the flywheel 120. Between these pulleys 130 and 132 is a pulley 140 provided with V-belt grooves. This pulley is fastened to the tapered end of the compressor drive shaft 142. The pulleys 130 and 132 which are normally stationary are also provided with V-belt grooves, and four V-belts 144 extend around all of the pulleys and are firmly lodged within their V-belt grooves. The eccentric fastening of the pulleys 132 and 130 is taken advantage of in order to adjust the tension of the belts. By turning the pulleys 130 and 132, the pulleys may be placed closer to or farther away from the axis of the pulley shaft 142. This modification differs from the first mentioned modification in that complete pulleys are provided in the place of the arc-shaped portion. It, however, is not as compact as the first modification, but is somewhat more simple and is slightly more flexible. Otherwise, the advantages of the two forms are substantially the same.

I find that these couplings are a considerable improvement over couplings heretofore employed, since they permit great flexibility in many different respects on account of their belt connection which permits torsional flexibility as well as universal flexibility to accommodate misalignment. The belts are readily replaceable and readily obtainable. Ordinarily, however, the belts do not require replacement.

While the form of embodiment of the invention as herein disclosed constitutes a preferred form, it is to be understood that other forms might be adopted, all coming within the scope of the claims which follow.

What is claimed is as follows:

1. A flexible coupling comprising a rotatable driving member, a rotatable driven member rotatable about substantially the same axis as the driving member, each of said members being provided with a V-belt groove, and a V-belt lodged within said grooves connecting the driving member and the driven member.

2. A flexible coupling comprising a rotatable driving member, a rotatable driven member rotatable about substantially the same axis as the driving member, one of said members being in the form of a pulley, the other of said members having a plurality of belt supports overlying the pulley, and belt means supported upon the belt supports and the pulley for connecting the driving member and the driven member.

3. A flexible coupling comprising a rotatable driving member, a rotatable driven member rotatable about substantially the same axis as the driving member, one of said members being in the form of a pulley, the other of said members having a plurality of belt supports overlying the pulley, belt means supported upon the belt supports and the pulley for connecting the driving member and the driven member, and means for adjusting said belt supports to adjust the tension of said belt means.

4. A flexible coupling comprising a rotatable driving member, a rotatable driven member, one of said members being in the form of a pulley, the other of said members having a plurality of arc-shaped belt supports substantially concentrically positioned with respect to the axis of the pulley member, and belt means supported upon the belt supports and the pulley for connecting the driving and driven members.

5. A flexible coupling comprising a rotatable driving member, a rotatable driven member, one of said members being in the form of a pulley, the other of said members having a plurality of arc-shaped belt supports substantially concentrically positioned with respect to the axis of the pulley member, belt means supported upon the belt suports and the pulley for connecting the driving and driven members, and means for adjusting the position of said arc-shaped belt supports with respect to the axis of the pulley.

6. A flexible coupling comprising a rotatable driving member, a rotatable driven member rotatable about substantially the same axis as the driving member, one of said members being in the form of a pulley, the other of said members having a plurality of belt supports overlying the pulley, said pulley and said belt supports being provided with the belt grooves, and V-belt means supported in V-belt grooves of the belt supports of the pulley for connecting the driving member and the driven member.

7. A flexible coupling comprising a rotatable driving member, a rotatable driven member rotatable about substantially the same axis as the driving member, one of said members being in the form of a pulley, the other of said members having a belt support, and belt means supported upon the belt support and the pulley for connecting the driving member and the driven member.

HARRY F. SMITH.